United States Patent [19]
d'Auria et al.

[11] Patent Number: 4,733,928
[45] Date of Patent: Mar. 29, 1988

[54] DEVICE WITH CIRCULATING OPTICAL DELAY LINE

[75] Inventors: Luigi d'Auria, Sceaux; Guy Chevalier, Champlan, both of France

[73] Assignee: Thomson CSF, Paris, France

[21] Appl. No.: 774,440

[22] Filed: Sep. 10, 1985

[30] Foreign Application Priority Data

Sep. 21, 1984 [FR] France .............................. 84 14566

[51] Int. Cl.⁴ .............................................. G02B 6/26
[52] U.S. Cl. ............................ 350/96.15; 350/96.18; 330/308
[58] Field of Search ................ 330/59, 308; 350/96.20, 350/96.15, 96.18, 96.30

[56] References Cited

U.S. PATENT DOCUMENTS

| | | | |
|---|---|---|---|
| 3,943,358 | 3/1976 | Reymond et al. | 350/96 |
| 3,953,727 | 4/1976 | d'Auria et al. | 455/610 |
| 4,063,343 | 12/1977 | Reymond et al. | 29/427 |
| 4,158,478 | 6/1979 | d'Auria et al. | 350/96.23 |
| 4,166,212 | 8/1979 | Judeinstein | 250/199 |
| 4,184,740 | 1/1980 | d'Auria et al. | 350/96.16 |
| 4,268,114 | 5/1981 | d'Auria et al. | 350/96.20 |
| 4,378,490 | 3/1983 | d'Auria | 250/201 |
| 4,410,235 | 10/1983 | Klement et al. | 350/96.18 |
| 4,529,986 | 7/1985 | d'Auria et al. | 350/96.15 X |
| 4,563,656 | 1/1986 | Baum | 330/308 |
| 4,603,941 | 8/1986 | Fujii et al. | 350/96.3 X |
| 4,653,042 | 3/1987 | d'Auria et al. | 455/607 X |
| 4,668,044 | 5/1987 | d'Auria et al. | 350/96.15 |

FOREIGN PATENT DOCUMENTS 0001728 9/1978 European Pat. Off. .
53-54905 5/1978 Japan .

OTHER PUBLICATIONS

*Electronics Review*, "Bouncing Beam", v. 38, No. 11, May 31, 1965, p. 31.

*Primary Examiner*—Eugene R. LaRoche
*Assistant Examiner*—Steven J. Mottola
*Attorney, Agent, or Firm*—Cushman, Darby & Cushman

[57] ABSTRACT

Optical fibre delay line device for producing a delay on a guided light pulse proportional to the length of the optical fibre, comprising single means for the emission and detection of the light pulse, constituted by a semiconductor laser diode also having photodetecting properties and coupled to one of the ends of the optical fibre. The other end of the optical fibre is rendered reflective or is coupled to a waveguide of variable length, which also has a reflecting end, in such a way that the light pulse traverses the length of the optical fibre twice.

7 Claims, 3 Drawing Figures

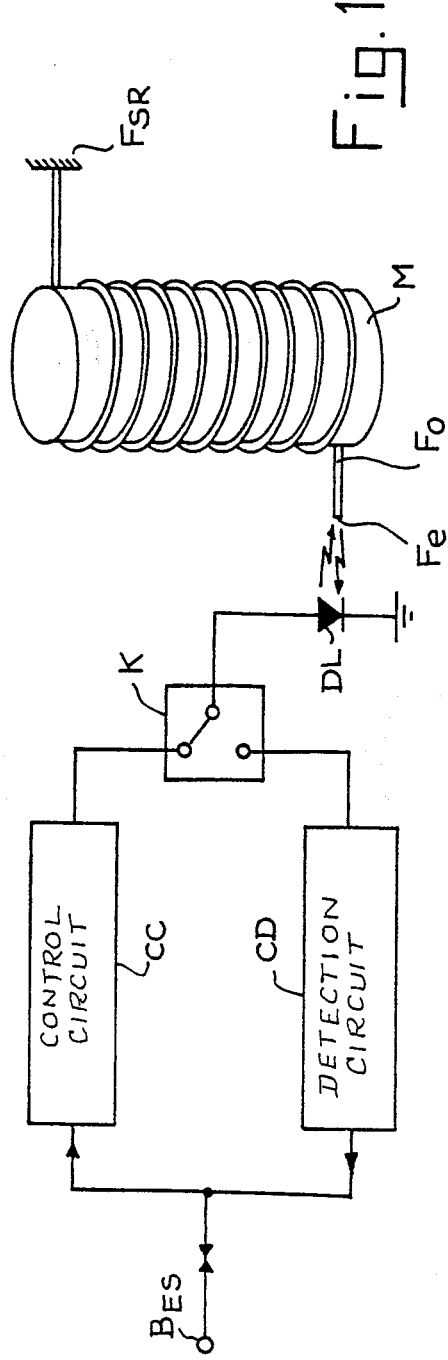
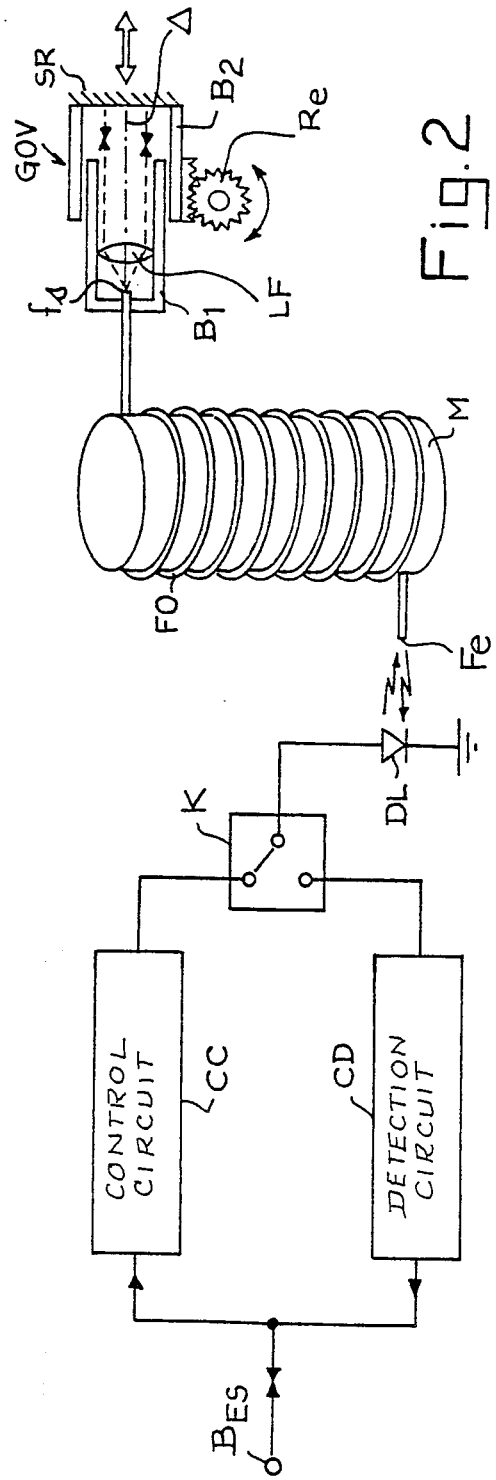

DEVICE WITH CIRCULATING OPTICAL DELAY LINE

BACKGROUND OF THE INVENTION

The present invention relates to a device with a circulating optical delay line of the type using an optical fibre as the delay element.

Devices of this type are used with particular advantage in the field of high resolution radars, particularly pulse radars of the M.T.I. (moving target indicator) type, and particularly of the non-coherent type which cancels out the fixed echos with the aid of a delay line.

It has also been demonstrated that the order of magnitude of the "pass band—delay" product was such that only delay lines produced with the aid of optical fibres would be suitable. In addition, optical fibres also have low transmission losses.

An optical fibre delay line device for a radar of the type referred to hereinbefore is especially described in the article by CHANG et al: "Non-coherent radar moving target indicator using fiber optic delay lines" published in the "IEEE Transactions on circuits and systems", volume CAS-26, no. 12, December 1979, pp. 1132–1134.

Devices of this type comprise a source emitting light pulses, optically coupled to one of the ends of an optical fibre for injecting these pulses there. They are then propagated in the guided mode into the optical fibre core to the other end and with a finite speed. Thus, the transit time is directly dependent on the length of the optical fibre and the speed of light in the material of the optical fibre core.

The other end of the optical fibre is coupled to optoelectronic detection means. A prior art device of this type is described in U.S. Pat. No. 4,166,212. In the case of the radar, the delay supplied by the delay line is equal to the time interval separating two pulses emitted by it. Typically, the orders of magnitude are in the respective ranges of a nanosecond for the width of the pulses and a millisecond for the time interval separating two pulses.

In view of the transmission speed of light in an optical fibre, it is necessary to use an optical fibre with a length of several kilometers, which implies an optical fibre with very low losses. This type of optical fibre is naturally onerous. Moreover, although the optical fibre is normally wound on to a coil former, the assembly is relatively cumbersome.

Finally, for certain applications in which the optical fibre length is particularly great, it can be necessary to use regenerative repeaters inserted in the line, which increases costs and complexity.

The invention is therefore directed at a device with a circulating optical delay line, in which the necessary optical fibre length is divided by a factor of 2. For this purpose, use is made of the properties of certain semiconductor laser diodes of also being photodetective under certain conditions. These properties are e.g. described in the article by ALPING et al, "Detection at G bit/rates with TJS GaAlAs laser" which appeared in the journal "Optics Communications," vol. 44, no. 6, 15.2.1983, pp. 381–383.

SUMMARY OF THE INVENTION

The present invention therefore relates to a device with a circulating optical delay line incorporating optoelectronic means for emitting a light pulse, an optical fibre having an optical path of given length, forming said delay line and optically coupled to said optoelectronic emission means, whilst guiding said light pulse, optoelectronic means optically coupled to the optical fibre for the detection and photoelectric conversion of said light pulse into an electric signal, means for generating an electric signal for controlling the emission of the light pulse and means for receiving said electric signals resulting from said photoelectric conversion wherein the emission and detection optoelectronic means are in the form of a single semiconductor element constituted by a semiconductor laser diode emitting light in a given wavelength and having photodetecting properties of light of the same wavelength, said laser diode being optically coupled to the first end of said optical fibre and a second end of said optical fibre being coupled to reflecting means, so as to retransmit a light pulse, emitted by the laser diode and guided by the optical fibre, to the laser diode for detection there and conversion into an electric signal following an outward and return travel on said given length of the optical fibre.

BRIEF DESCRIPTION OF THE DRAWINGS

The invention is described in greater detail hereinafter relative to non-limitative embodiments and the attached drawings, wherein:

FIG. 1 diagrammatically shows a device according to the invention;

FIG. 2 shows a supplementary variant of the device according to the invention.

DETAILED DESCRIPTION OF THE PREFERRED EMBODIMENTS

Figure 3:
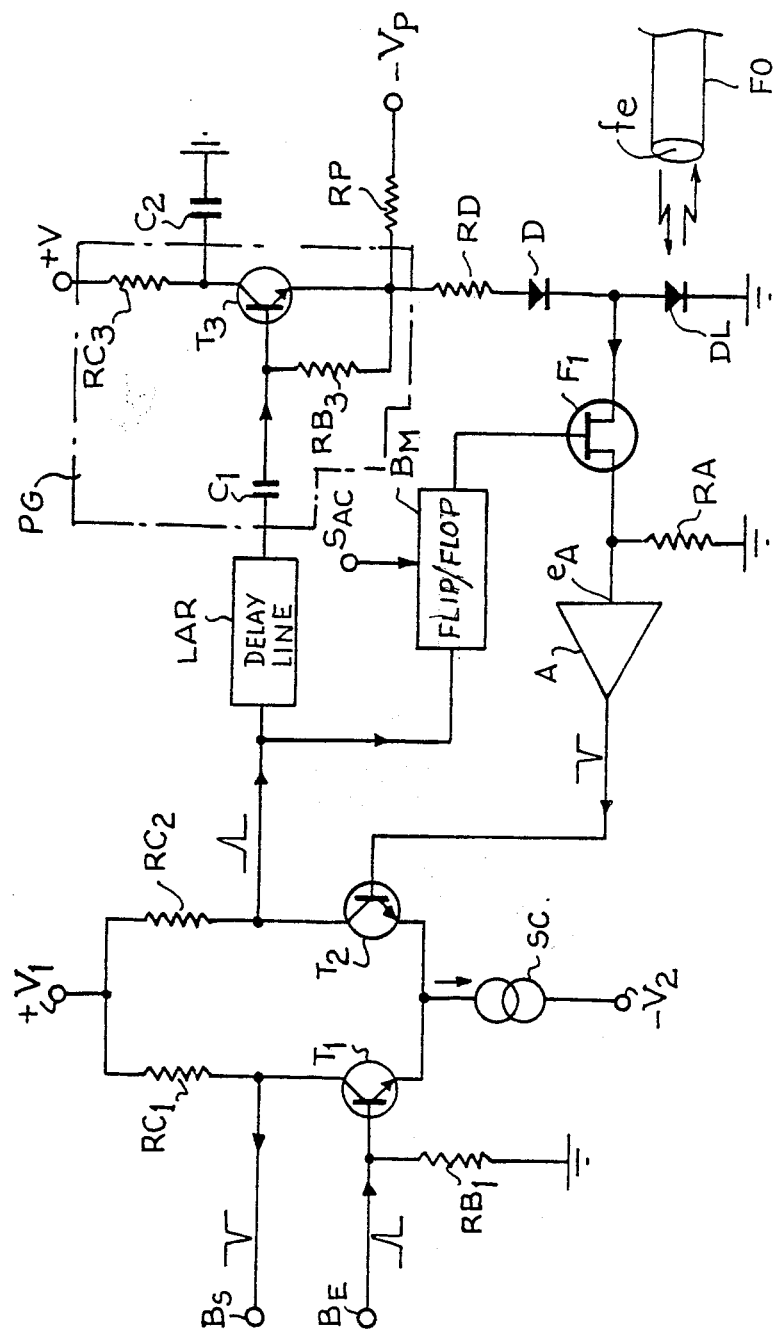
FIG. 3 shows a specific embodiment of the devices according to FIG. 1 or 2.

FIG. 1 diagrammatically shows a device with a circulating optical delay line according to a first constructional variant of the invention.

According to one of the main features, a laser diode DL is provided of a type which is able to function both as a light emitter and as a light receiver, as a result of photodetecting properties.

A certain number of semiconductor components have said characteristic, such as semiconductor laser diodes of the GaAlAs/GaAs type (gallium-aluminium-arsenic/gallium arsenic) or GaAlAs type (gallium-aluminium-arsenic) having a transverse junction strip or TJS structure and described in the aforementioned ALPING article. It is also possible to use a laser diode of the GaInAsP type (gallium-indium-arsenic-phosphorus).

This laser diode is optically coupled to one of the ends of an optical fibre FO, more specifically to what is hereinafter called the input face $f_e$ of the optical fibre.

The other end of the optical fibre FO has a reflecting element or is made reflecting on what will hereinafter called the output face of $f_{SR}$.

The electronic circuits associated with the said optoelectronic components comprise on the one hand a control circuit CC and on the other a detection circuit CD. A switch K alternately connects the laser diode DL to one of the circuits CC or CD, respectively in the emitter mode and in the receiver mode.

The function of the control circuit CC is to generate a short-term electric pulse which modulates in the emitter mode, the emission of the laser diode DL. The resulting light pulse is injected and transmitted in guided mode by the core of the optical fibre FO. The latter, represented in the form of a coil is wound around a coil former M as a length L.

Transmission time $T_o$ of a light pulse between two ends of the optical fibre is dependent on the optical path of the latter and, as is known, obeys the relationship $T_o = L/(c/n)$, in which C is the speed of light and n the mean refractive index of the optical fibre.

This light pulse is reflected by the output face $f_{SR}$, which is reflective, and retransmitted to input face $f_e$. Thus, the total transit time is equal to 2 $T_o$. During this time interval, device according to the invention is switched in the receiver mode. The switch K then connects the laser diode to the detector circuit CD.

Following detection, photoelectric conversion and amplification of the electrical signals resulting from the conversion, said electrical signals can be retransmitted to the control circuit in the manner to be defined hereinafter and again modulate the laser diode. The resulting light pulse performs a further outward and return travel in the optical fibre and the cycle recommences.

FIG. 1 also shows a signal input-output terminal $B_{ES}$ for the communication with not shown circuits for the generation of control signals transmitted to the device and the processing of signals received by the latter. These circuits fall outside the scope of the invention. For example, they may be a conventional tube radar circuits VCM.

The time lag $T_C$ corresponding to an elementary cycle is in the form:

$$T_C = 2T_O + T_E$$

in which $T_E$ is the transit time of the electronic circuits CD and CC. The total time lag or delay is dependent on the number of cycles performed.

Thus, the device according to the invention has numerous advantages compared with the prior art circuits.

The main advantage is naturally that it makes it possible to divide in a ratio of 1:2 the necessary optical fibre length, because the transit time in the fibre is multiplied by 2, for an elementary cycle. Thus, only a single optoelectronic element is required, i.e. laser diode DL.

It should also be noted that the measures taken within the scope of the invention are advantageous with respect to the switching of the emission to reception modes and conversely reception to emission mode.

Thus, the laser diode DL is in the emission mode when traversed by a strong forward current and in the detection mode is traversed by a weak reverse current.

It is therefore easy to switch from the detection mode to the emission mode and vice versa. However, the switching from the emission mode to the detection mode takes place in a relatively long time interval (2 $T_o$), whereas switching from the detection mode to the emission mode must take place in a very short time interval.

Finally, it is pointed out that the measures taken give free access to one of the ends of optical fibre FO serving as the main delay element. Advantage can be taken of this feature.

FIG. 2 shows a supplementary variant of the device according to the invention which takes advantage of this.

FIG. 2 shows the main elements of the device of FIG. 1. The identical elements will not be described again hereinafter.

The essential difference is based on the fact that the output face (FIG. 1: $F_{SR}$) of the optical fibre FO is no longer directly associated with a reflecting element or which is made reflecting.

The end of this optical fibre is optically coupled to an optical waveguide GOV of an adjustable length l.

The total length of the optical path equivalent to the optical fibre FO and to the waveguide GOV then becomes (L+l), with l being adjustable.

In a possible variant shown in FIG. 2, the waveguide GOV is constituted by two cylindrical boxes $B_1$ and $B_2$ sliding along the symmetrical axis of revolution of the two cylindrical boxes.

The first box $B_1$ grips around the end of fibre FO, whose output face $f_s$ centred on axis $\Delta$ plays the part of a divergent light source. In said first box $B_1$ is placed a focusing lens LF, which transforms the divergent beam emerging from face $f_E$ into a collimated beam parallel to axis $\Delta$.

The inside face of the second box $B_2$ has a reflecting surface SR orthogonal to axis $\Delta$. Thus, the collimated beam is reflected, retransmitted to lens LF and then acts as a collimating lens and then reinjected into the optical fibre. The operating mode is then identical to that described relative to FIG. 1.

The time lag for an elementary cycle consequently becomes:

$$T'_c = 2 \frac{(L + l)}{(c/n)} + T_E$$

with l adjustable or $T'C = T_C + \Delta T$.

Thus, in this way it is possible to finely adjust the values of the time $T'_C$.

All the conventional means such as screws or the like for regulating the value of the length l of the optical path of waveguide GOV can be used within the scope of the invention. FIG. 2 diagrammatically shows a screw drive regulating means R1.

A practical embodiment of the controls CC and the detection CD circuit will now be described relative to FIG. 3. These circuits CC and CD, whose functions are represented in the form of block diagrams in FIGS. 1 and 2, are combined into a single physical circuit in FIG. 3.

It firstly comprises an input-output stage of the differential amplifier type acting as the interface with not shown circuits for generating signals to be delayed and processing said delayed signals by the device according to the invention. In an advantageous application of the device according to the invention, these are conventional circuits of a radar, particularly a high resolution radar, as stated hereinbefore.

The input-output stage comprises two npn transistors $T_1$ and $T_2$, which are coupled by their emitters. The collectors of these transistors are in each case connected to a first end of a load resistor $RC_1$ and $RC_2$ respectively. The other end is connected to a terminal raised to a positive potential $+V_1$. The emitters are connected, via a current source SC to a terminal raised to a negative potential $-V_2$.

The external output of this stage takes place by the collector of transistor $T_1$ connected to an output terminal $B_S$ and the input terminal by the base of said transistor connected to an input terminal $B_E$. The load resistor $RB_1$ is connected between the base of transistor $T_1$ and the zero potential represented by the earth potential.

Terminals $B_S$ and $B_E$ function as the input-output terminal $B_{ES}$ represented in FIGS. 1 and 2.

A pulse to be delayed is transmitted to the device according to the invention via input terminal $B_E$. The collector of transistor $T_2$ is connected to a delay line LAR and to a monostable flip-flop BM.

The delay line LAR is controlled, via pulse generator PG which includes a shunt capacitor $C_1$, an avalanche transistor $T_3$ which reshapes the pulse to be delayed, transmitted via the input-output stage and the delay line. In the form of a current pulse passing in the forward direction through the laser diode DL, said pulse will be used for controlling the emission thereof. Transistor $T_3$ is connected via a collector resistor $RC_3$ to a potential $+V$ equal to its avalanche voltage. A capacitor $C_2$ is placed between the collector and the zero potential, represented by the earth potential. Capacitor $C_2$ is checked via resistor $RC_3$ to potential $+V$ and the thus accumulated electric charges are released into the laser diode DL when transistor $T_3$ is made conductive, i.e. when the pulse to be delayed is transmitted to its base by delay line LAR and shunt capacitor $C_1$.

The electric charges flow in diode DL across a series circuit incorporating a current-limiting resistor RD and a forward-biased diode D.

The more specifically receiving part of the device comprises, apart from the laser diode DL, which also serves as a photodetector as described, a field effect transistor $F_1$ and a regenerative amplifier A, whose output is connected to the base of transistor $T_2$ of the input-output stage. The field effect transistor $F_1$ serves as an electronic switch and is placed between the amplifier input $e_a$ of amplifier A and the anode of the laser diode DL. It is controlled, via its gate, via output signals from monostable flip-flop BM.

The delay line LAR makes it possible to render "blind" the receiver part of the device according to the invention by means of the pulse supplied by monostable flip-flop BM, which blocks the field effect transistor $F_1$ a few nanoseconds before capacitor $C_2$ supplies the forward current to laser diode DL.

The duration of the pulse of monostable flip-flop BM corresponds to the delay supplied by delay line LAR which is typically a few nanoseconds, increased by the time necessary for the laser diode DL to return to the blocked state. As soon as the light pulse is injected into the optical fibre FO, the receiver part is in a wait or watch position.

The field effect transistor $F_1$ is conductive and diode D is negatively biased as a result of a series circuit connected to a negative biasing potential $-V_P$, incorporating, apart from resistor RD, a resistor RP having a high ohmic value compared with resistor RD.

Thus, it is necessary for most of the charges accumulated in capacitor $C_2$ to flow into laser diode DL and not into resistor RP during the discharge of said capacitor.

This reverse-biased diode D isolates the laser diode DL from the control part.

The photocurrent generated by the laser diode acting as a photodetector in the presence of the light pulse following an outward and return travel in optical fibre FO, is amplifier by amplifier A, because field effect transistor $F_1$ is conductive. By controlling the base of transistor $T_2$ of the differential input-output stage, the pulse is naturally reversed on the collector of said transistor and is retransmitted, via delay line LAR and capacitor $C_1$ to the base of transistor $T_3$.

A new cycle then starts in the same way as described hereinbefore.

To stop the recirculation of the pulse to be delayed, it is merely sufficient to "blind" the transistor $F_1$ on the return of the pulse via the monostable flip-flop. A stop signal of cycle $S_{AC}$ is applied to the monostable flip-flop, said signal being processed by not shown load circuits. It is merely necessary to use a monostable flip-flop having a logic inhibiting gate.

This monostable flip-flop, as well as other active components shown in FIG. 3 are commercially available in the form of integrated or discrete semiconductor circuits.

The determination of the exact values of the voltages, as well as the dimensioning of different components, such as resistors, capacitors, delay lines, etc. are dependent on technological choices within the scope of one of ordinary skill in the art, as well as the constraints imposed by circuits for generating the pulses to be delayed and circuits for processing these delayed pulses.

As a non-limitative example, Table I at the end of the present description gives typical data for the main elements used in an experimental realization of the device according to the invention. The application envisaged is that of a high resolution radar.

The circuit of FIG. 3 is obviously compatible with constructional variants illustrated by FIGS. 1 and 2, which only differ through the presence or absence of a supplementary waveguide of variable length, for a fine adjustment of the transit time.

The device according to the invention is not limited to the embodiments shown in a non-limitative manner, and various electrical circuits can fulfil the control and reception functions associated with the single optoelectronic light emission and photodetection member.

TABLE I

| PRACTICAL EXAMPLE | |
| --- | --- |
| Optical fibre: | Monomode attenutation type: ~0.5 dB/km (for a wavelength of 1300 nm) |
| Laser diode: | GaInAsP |
| Fibre length: | 5 km |
| Elementary time lag: | 50 μs |
| Number of cycles: | 10 |
| Total time lag: | 0.5 ms |
| Width of pulses to be delayed: | ~2 ns |
| Delay x band width product: | >$10^5$ |

What is claimed is:

1. A circulating optical delay line device comprising:
an optical fibre having an optical path of a predetermined length, and configured to form an optical delay line;
optoelectric means, optically coupled to said optical fiber for emitting a pulse of light and for detecting and photoelectrically converting a received light pulse into an electric signal, said optoelectronic means being a single semiconductor element constituted by a semiconductor laser diode for emitting light at a given wavelength and having photo detecting properties for light of the same wavelength, said laser diode being optically coupled to a first end of said optical fibre;
means for generating an electric signal for controlling the emission of said emitted light pulse;
means for receiving said electric signals from said optoelectronic means;

reflecting means, coupled to a second end of said optical fibre for reflecting a light pulse emitted by said diode and carried through said fiber back through said fiber to said optoelectronic means for detection therein, so that said emitted light pulse is converted into an electric signal following an outward and return travel on said predetermined length of the optical fibre, and wherein said reception means comprises an amplifier for amplifying the electric signal resulting from the photoelectric conversion to produce an amplified electric signal; and means for selectively reinjecting said amplified electric signal into said generating means to repeat an elementary cycle incorporating the emission of a light pulse, an outward and return travel of said light pulse over said predetermined length of the optical paths of the optical fibre, and connection and conversion of said light pulse into an electric signal a given number of times, thereby multiplying a time lag by said given number of times.

2. A circulating optical delay line device comprising:

an optical fibre having an optical path of a predetermined length, and configured to form an optical delay line;

optoelectronic means, optically coupled to said optical fiber for emitting a pulse of light and for detecting and photoelectrically converting a received light pulse into an electric signal, said optoelectronic means being a single semiconductor element constituted by a semiconductor laser diode for emitting light at a given wavelength and having photodetecting properties for light of the same wavelength, said laser diode being optically coupled to a first end of said optical fibre;

means for generating an electric signal for controlling the emission of said emitted light pulse;

means for receiving said electric signals from said optoelectronic means;

reflecting means, coupled to a second end of said optical fibre for reflecting a light pulse emitted by said diode and carried through said fiber back through said fiber to said optoelectronic means for detection therein, so that said emitted light pulse is converted into an electric signal following an outward and return travel on said predetermined length of the optical fibre, and wherein said generating means comprises a pulse-type current generator for controlling the emission of light from the laser diode, having an avalanche transistor, a capacitive circuit for accumulating charges flowing, when said avalanche transistor becomes conductive, and a current limiting impedance, a series circuit incorporating said transistor and said current-limiting impedance formed to force a forward current of given amplitude into the laser diode.

3. A device according to claim 1, wherein the laser diode is a semiconductor diode of the gallium-indium-arsenic-phosphorus type.

4. A circulating optical delay line device comprising:

an optical fibre having an optical path of a predetermined length, and configured to form an optical delay line;

optoelectronic means, optically coupled to said optical fiber for emitting a pulse of light and for detecting and photoelectrically converting a received light pulse into an electric signal, said optoelectronic means being a single semiconductor element constituted by a semiconductor laser diode emitting light at a given wavelength and having photodetecting properties for light of the same wavelength, said laser diode being optically coupled to a first end of said optical fibre;

means for generating an electric signal for controlling the emission of said emitted light pulse;

means for receiving said electric signals from said optoelectronic means;

reflecting means, coupled to a second end of said optical fibre for reflecting a light pulse emitted by said diode and carried through said fiber back through said fiber to said optoelectronic means for detection therein, so that said emitted light pulse is converted into an electric signal following an outward and return travel on said predetermined length of the optical fibre, wherein the reflecting means are constituted by an optical waveguide, of an adjustble length, coupled at a first end to said second end of said optical fibre and having a second end which is rendered reflective, so as to trap light emerging from the second end of optical fibre, reflect it and reinject it into the optical fibre, the optical path taken by said waveguide being substantially double said injectable length.

5. A device according to claim 4, wherein said waveguide is constituted by two cylindrical boxes having a common axis revolution, one of said boxes sliding in the other of said boxes, in a direction parallel to said axis, said second end of the optical fibre passing through a base of the first box so as to emit light by its output face in a preferred direction parallel to said axis, said first box including a collimating lens located in the box which transforms the emitted light into a bundle of parallel rays, and wherein the internal base of the second box has a planar reflecting surface orthogonal to said axis.

6. A device according to claim 4, further comprising switching means for alternately connecting said laser diode to: (1) said means for generating said electric signal to control said emission of a light pulse during a first time interval and (2) said reception means outside said time interval.

7. A device according to claim 4 wherein said reception means comprises an amplifier for amplifying the electric signals resulting from the photoelectric conversion.

* * * * *